(12) United States Patent
Guo et al.

(10) Patent No.: US 11,329,965 B2
(45) Date of Patent: *May 10, 2022

(54) METHOD FOR DYNAMIC ENCRYPTION AND SIGNING, TERMINAL, AND SERVER

(71) Applicant: TENCENT TECHNOLOGY (SHENZHEN) COMPANY LIMITED, Shenzhen (CN)

(72) Inventors: Yixin Guo, Shenzhen (CN); Hang Yu, Shenzhen (CN); Chun Wang, Shenzhen (CN); Xianhua Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 173 days.

This patent is subject to a terminal disclaimer.

(21) Appl. No.: 16/912,677

(22) Filed: Jun. 25, 2020

(65) Prior Publication Data

US 2020/0329020 A1 Oct. 15, 2020

Related U.S. Application Data

(63) Continuation of application No. 15/692,378, filed on Aug. 31, 2017, now Pat. No. 10,742,620, which is a
(Continued)

(30) Foreign Application Priority Data

Sep. 29, 2015 (CN) .......................... 201510631689.2

(51) Int. Cl.
  *H04L 9/08* (2006.01)
  *H04L 29/06* (2006.01)
(Continued)

(52) U.S. Cl.
  CPC ........ *H04L 63/0457* (2013.01); *H04L 9/0869* (2013.01); *H04L 9/14* (2013.01);
(Continued)

(58) Field of Classification Search
  CPC ..... H04L 63/0457; H04L 9/14; H04L 63/061; H04L 9/3247; H04L 9/0869; H04L 9/3297
See application file for complete search history.

(56) References Cited

U.S. PATENT DOCUMENTS 7,127,067 B1 10/2006 Wachtler et al.
8,867,743 B1 * 10/2014 Salvaji ...................... H04L 9/14
                                                                    380/260
(Continued)

FOREIGN PATENT DOCUMENTS

CN 103220280 A 7/2013
CN 103986583 A 8/2014
(Continued)

OTHER PUBLICATIONS

Notification of the First Office Action of Japanese application No. 2017-552030, with English translation, dated Sep. 14, 2018.
(Continued)

*Primary Examiner* — Meng Li
(74) *Attorney, Agent, or Firm* — Anova Law Group, PLLC

(57) ABSTRACT

A method for dynamic encryption and signing includes: obtaining, by a terminal during session connection, a predetermined first key index and a randomly-generated first signature index; signing session request data with a first signature corresponding to the first signature index; encrypting the session request data with a first key corresponding to the first key index; sending the encrypted session request data and the first signature index to the server; and receiving,
(Continued)

from the server, session response data signed with a second signature corresponding to a second signature index and encrypted with a second key corresponding to a second key index, after decryption and signature verification by the server over the session request data succeed. The second signature index and the second key index are randomly selected by the server and saved in a login session object accessible by both the server and the terminal.

20 Claims, 7 Drawing Sheets

Related U.S. Application Data continuation of application No. PCT/CN2016/079217, filed on Apr. 13, 2016.

(51) Int. Cl.
  *H04L 9/14* (2006.01)
  *H04L 9/32* (2006.01)
(52) U.S. Cl.
  CPC .......... *H04L 9/3247* (2013.01); *H04L 9/3297* (2013.01); *H04L 63/061* (2013.01)

(56) References Cited

U.S. PATENT DOCUMENTS

| | | |
|---|---|---|
| 2005/0201564 A1 | 9/2005 | Kayashima et al. |
| 2008/0072055 A1* | 3/2008 | Volkovs ................ H04L 9/3013 713/180 |
| 2009/0006512 A1 | 1/2009 | Ozturk et al. |
| 2010/0211787 A1* | 8/2010 | Bukshpun ................ H04L 9/14 380/255 |
| 2012/0250863 A1 | 10/2012 | Bukshpun et al. |
| 2013/0031369 A1* | 1/2013 | Balinsky ................ H04L 9/088 713/176 |
| 2013/0067213 A1 | 3/2013 | Liu |
| 2015/0006914 A1 | 1/2015 | Oshida |
| 2016/0036808 A1 | 2/2016 | Li |
| 2017/0019388 A1* | 1/2017 | Kamble ................ H04L 63/068 |
| 2018/0013735 A1* | 1/2018 | Guo ........................ H04L 9/14 |

FOREIGN PATENT DOCUMENTS

| | | |
|---|---|---|
| EP | 1280098 A1 | 1/2003 |
| JP | 2005260286 A | 9/2005 |
| JP | 2012242971 A | 12/2012 |
| JP | 5260163 B2 | 8/2013 |
| JP | 2015012409 A | 1/2015 |

OTHER PUBLICATIONS

Shin-ichi Ikeno others—some or all of nonpatent literatures that was shown may not be sent by restriction of present age code theory, Japan, Institute of Electronics, Information and Communication Engineers, Nov. 15, 1997, first edition 6th printing, pp. 217-225 (Document showing a well-known technique) (notes) law, or a contract.

English Translation of the Written Opinion of the International Search Authority in international application No. PCT/CN2016/079217, dated Jun. 28, 2016.

Partial Supplementary European Search Report in European application No. 16850062.7, dated Jul. 13, 2018.

International Search Report in international application No. PCT/CN2016/079217, dated Jun. 28, 2016.

* cited by examiner

METHOD FOR DYNAMIC ENCRYPTION AND SIGNING, TERMINAL, AND SERVER

CROSS-REFERENCES TO RELATED APPLICATIONS

The present application is a continuation application of U.S. patent application Ser. No. 15/692,378, filed on Aug. 31, 2017. U.S. patent application Ser. No. 15/692,378 is a continuation application of pending International Application PCT/CN2016/079217 which is filed based on and claims priority to Chinese Application No. 201510631689.2, filed on Sep. 29, 2015 and titled with "DYNAMIC ENCRYPTION METHOD, TERMINAL AND SERVER", the entire contents of all of which are hereby incorporated by reference.

TECHNICAL FIELD

The present disclosure relates to an encryption technology, and in particular to a method for dynamic encryption and signing, a terminal and a server.

BACKGROUND

During communication between a terminal and a server, a Hyper Text Transfer Protocol over Secure Socket Layer (HTTPS) is usually adopted to authenticate an identity of the server and establish a trusted channel. Specifically, a server certificate is authenticated through a Certification Authority (CA) certificate of a browser, thereby acquiring a public key of the server. An asymmetric key is negotiated by the public key of the server and a private key stored in the server, and is held in a session object once being negotiated. The terminal and the server use the asymmetric key for encryption in a subsequent session.

A symmetric encryption system may also be developed by the terminal and the server for the communication between the terminal and the server through a service. A symmetric key is hard-coded in the terminal to achieve relatively high symmetric encryption efficiency.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

One aspect of the present disclosure provides a method for dynamic encryption and signing. The method includes obtaining, by a terminal during session connection, a predetermined first key index and a randomly-generated first signature index; signing session request data with a first signature corresponding to the first signature index; and encrypting the session request data with a first key corresponding to the first key index. The terminal and a server store same plurality of keys accessible by key indexes and same plurality of signatures accessible by signature indexes. The method also includes sending the encrypted session request data and the first signature index to the server; and receiving, from the server, session response data signed with a second signature corresponding to a second signature index and encrypted with a second key corresponding to a second key index, after decryption and signature verification by the server over the session request data succeed. The second signature index and the second key index are randomly selected by the server and saved in a login session object accessible by both the server and the terminal.

Another aspect of the present disclosure provides a terminal including a processor and a communication interface. The processor is configured to: obtain, during session connection, a predetermined first key index and a randomly-generated first signature index, wherein the terminal and a server store same plurality of keys accessible by key indexes and same plurality of signatures accessible by signature indexes; sign session request data with a first signature corresponding to the first signature index; and encrypt the session request data with a first key corresponding to the first key index. The communication interface is configured to: send the encrypted session request data and the first signature index to the server; and receive, from the server, session response data signed with a second signature corresponding to a second signature index and encrypted with a second key corresponding to a second key index, after decryption and signature verification by the server over the session request data succeed. The second signature index and the second key index are randomly selected by the server and saved in a login session object accessible by both the server and the terminal.

Another aspect of the present disclosure provides a method for dynamic encryption and signing at a server. The method includes: receiving, from a terminal, session request data signed with a first signature and encrypted with a first key, and a first signature index during session connection, the first signature index being randomly generated by the terminal, the terminal and the server storing same plurality of keys accessible by key indexes and same plurality of signatures accessible by signature indexes; locating the first key from the stored plurality of keys according to a first key index predetermined between the terminal and the server; and locating the first signature from the plurality of signatures according to the first signature index. The method also includes decrypting the session request data by using the first key, and performing signature verification on the session request data by using the first signature; randomly selecting a second key index and a second signature index after the signature verification succeeds; saving the second signature index and the second key index in a login session object accessible by both the server and the terminal; and signing session response data with a second signature corresponding to the second signature index, and encrypting the session response data with a second key corresponding to the second key index and sending the encrypted session response data to the terminal.

Another aspect of the present disclosure provides a server. The server includes a processor and a memory. The processor is configured to receive, from a terminal, session request data signed with a first signature and encrypted with a first key, and a first signature index during session connection. The first signature index is randomly generated by the terminal, and the terminal and the server store same plurality of keys accessible by key indexes and same plurality of signatures accessible by signature indexes. The processor is also configured to locate the first key from the stored plurality of keys according to a first key index predetermined between the terminal and the server; locate the first signature from the plurality of signatures according to the first signature index; decrypt the session request data by using the first key, and perform signature verification on the session request data by using the first signature; randomly select a second key index and a second signature index after the signature verification succeeds; save the second signature index and the second key index in a login session object accessible by both the server and the terminal; and sign session response data with a second signature corresponding to the second signature index, encrypt the session response data with a second key corresponding to the second key index, and send the encrypted session response data to the terminal.

DETAILED DESCRIPTION

The present disclosure will be further described below in detail with reference to the drawings and embodiments. It is to be understood that the specific embodiments described here are exemplary and explanatory and are not restrictive of the present disclosure, as claimed.

Reference will now be made in detail to exemplary aspects of the present disclosure, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims. In addition, it is to be noted that for convenience of description, only parts relevant to the present disclosure, instead of all structures, are shown in the accompanying drawings.

Certain terms used in the present disclosure are only intended to describe specific aspects, but are not intended to limit the present disclosure. For example, singular form words "a," "said," and "the" used in the present disclosure and the appended claims are intended to include plural form, unless otherwise clearly stated. Also, the term "and/or" used herein refers to any or all combinations of one or more listed related items.

It is to be understood that although the aspects of the present disclosure may apply terms including first, second, third and so on to describe various information, these information should not be limited to these terms. These terms are only used for distinguishing information of the same type from each other. For example, first information may be also called second information without departing from the scope of the aspects of the present disclosure, and similarly, second information may be also called first information, which depends on context. For example, the word "if" used here may be interpreted as "at the moment when . . . " or "when . . . " or "in response to confirmation".

It is to be noted that although the flowcharts in some exemplary aspects describe each step as a sequenced process, a variety of steps therein may be implemented in parallel, concurrently or simultaneously. In addition, the sequence of all steps may be re-arranged. When the operation is completed, the process may be ended, but additional steps not included in the accompanying drawings may be executed. The process may correspond to a method, a function, a regulation, a sub-routine, a sub-program and the like.

Figure 1:
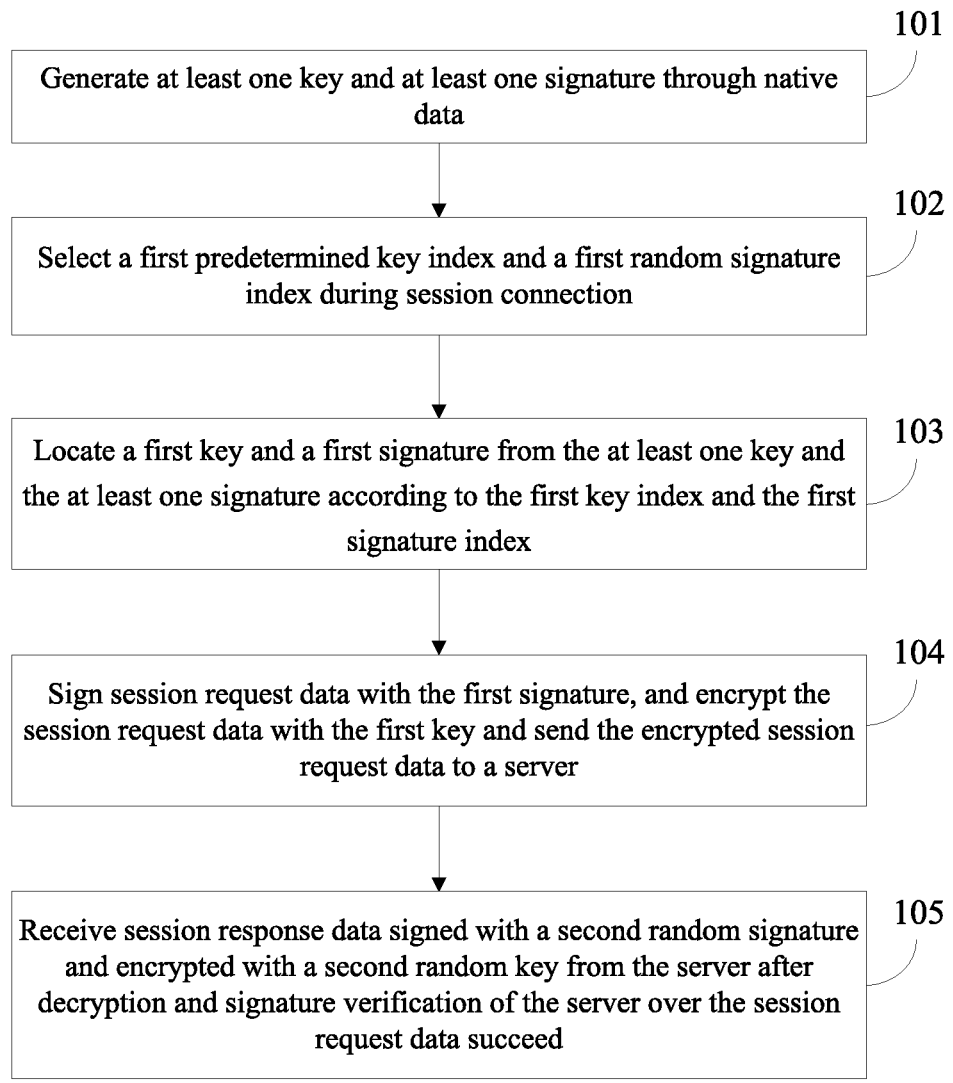
FIG. 1 is a flowchart of a method for dynamic encryption and signing according to embodiment 1 of the present disclosure.

FIG. 1 is a flowchart of a method for dynamic encryption and signing according to embodiment 1 of the present disclosure. The method for dynamic encryption and signing in this example is applied to a terminal side. As shown in FIG. 1, the method for dynamic encryption and signing includes the following steps.

In Step 101, at least one key and at least one signature are generated through native data.

Here, a terminal may be fixed electronic equipment such as a Personal Computer (PC), or may also be portable electronic equipment such as a Personal Digital Assistant (PDA), a tablet computer and a laptop computer, or of course, may also be a smart mobile terminal such as a smart phone.

In the embodiment of the present disclosure, for establishing an efficient and reliable encryption channel between a terminal and a server and for preventing a key which is hard-coded into the terminal from being forcibly cracked, the keys and signatures of the terminal are generated through native data, such as C language, and a related interface is provided by a dynamic native library for accessing the keys and signatures. Meanwhile, for preventing cracking when there is only one key or signature, a series of symmetric keys and signatures are embedded in a native library, and a key index and signature index-based access manner is provided, so that the embedded symmetric keys and signatures are prevented from being read. The server is also set with symmetric keys and signatures corresponding one by one to those in the terminal.

Referring to Table 1, five sets of key indexes and corresponding keys and five sets of signature indexes and corresponding signatures thereof are shown in Table 1. The corresponding keys may be located by virtue of the key indexes, and the corresponding signatures may be located by virtue of the signature indexes. For example, the corresponding key C1 may be located by virtue of the key index 2, and the corresponding signature A2 may be located by virtue of the signature index 0.

TABLE 1

| Key index | Key | Signature index | Signature |
|---|---|---|---|
| 0 | A1 | 0 | A2 |
| 1 | B1 | 1 | B2 |
| 2 | C1 | 2 | C2 |
| 3 | D1 | 3 | D2 |
| 4 | E1 | 4 | E2 |

In Step 102, a first predetermined key index and a first random signature index are selected during session connection.

In the embodiment of the present disclosure, during each session initialization, the terminal selects the first predetermined key index and the first random signature index at first.

Here, the first predetermined key index is a key index predetermined by the terminal and the server, and usually may be set to be a default key index with a key index number 0.

Here, the first random signature index may be determined in a manner of acquiring a current timestamp or a random number.

Specifically, the current timestamp is acquired, and first transformation is performed on the current timestamp to obtain the first signature index; or, the random number is acquired, and second transformation is performed on the random number to obtain the first signature index.

For example, the current timestamp is 2015.05.05.08.34 which means 8:34 on May 5, 2015, then a result obtained by transformation over the timestamp, such as a remainder obtained by dividing the seconds by 5, is the signature index.

For another example, the random number is acquired using a random function of the terminal, and a result, i.e. a remainder obtained by dividing the random number by 5, is the signature index.

In the embodiment of the present disclosure, session refers to management of a series of objects which have a status dependence relationship with each other. The context of a service flow may be connected in series through the session.

In Step 103, a first key and a first signature are located from the at least one key and the at least one signature according to the first key index and the first signature index.

After determining the first key index and the first signature index, the terminal may find the first key and the first signature from the at least one key and the at least one signature according to the first key index and the first signature index. For example, in Table 1, the corresponding key C1 may be located by virtue of the key index 2, and the corresponding signature A2 may be located by virtue of the signature index 0.

Step 104: session request data is signed with the first signature, and the session request data is encrypted with the first key and then sent to a server.

Here, the session request data would be different depending on the types of the terminal. For example, if the terminal is electronic equipment of a Near Field Communication (NFC) type and the terminal may realize a loading function using NFC, then the session request data may include a user Identification (ID), trade information and the like.

Here, NFC belongs to a short-distance high-frequency radio technology, and runs within a distance of 20 centimeters at a frequency of 13.56 MHz. It has three transmission speeds, i.e. 106 Kbit/second, 212 Kbit/second and 424 Kbit/second. At present, NFC has become an international standard ISO/IEC IS 18092, a standard ECMA-340 and a standard ETSI TS 102 190. An NFC technology may be used for boarding verification at an airport, an access control key of a building, an all-purpose traffic card, a credit card, a payment card and the like.

Loading refers to directly loading (depositing) money in a bank account of a consumer into an Integrated Circuit (IC) wafer, i.e. a process of forming an electronic wallet. In such a manner, the consumer with cashes may be prevented from changing money, losing money, receiving counterfeit money and being robbed of money.

In addition, if the terminal is electronic equipment of the NFC type and may realize an information verification function using NFC, then the session request data may include a user ID.

For another example, if the terminal has a Bluetooth function and the terminal may send a bill query request to the server through Bluetooth, then the session request data may include a user ID, information of a queried object, and the like.

In Step 105, session response data signed with a second random signature and encrypted with a second random key is received from the server after decryption and signature verification by the server over the session request data succeed.

A second key index and a second signature index are stored in a login session object.

Here, once a session is established between the terminal and the server, the session exists all the time. The session is in a login state, and the server may release the session resource after an idle (no session request is made) time of the terminal exceeds a certain time limit. During session login, the terminal may send many session requests to the server, and these session requests are all stored in the same session. A session object is arranged to store information needed by a specific terminal session, such a session ID and a session key. During establishment of the session, the server establishes a session object for the terminal, and the session object is applicable to the login state and thus is called as a login session object.

In the embodiment of the present disclosure, the second key index and the second signature index are stored in the login session object, and then the terminal and the server may both obtain the second key index and the second signature index through the login session object, thereby further obtaining the corresponding second key and second signature to implement data encryption and decryption of the terminal and the server, and improving data security.

The server performs decryption and signature verification on the session request data of the terminal according to a predetermined key index and signature index. After the signature verification succeeds, the server randomly selects a new key index and signature index, and stores the new key index and signature index into the login session object together with the login state, so that the key index and the signature index both may be stored in the whole login session, meanwhile, the response data is signed with a signature (First Key) corresponding to the new signature index, and the response data is encrypted with a key corresponding to the new key index and is sent to the terminal. Accordingly, the terminal receives, from the server, the session response data signed with the new signature (First Key) and encrypted with the new key.

An encryption channel of a login state lifecycle is established between the terminal and the server by the steps above.

In the embodiment of the present disclosure, the first signature index is encrypted while the session request data is encrypted with the first key, and the encrypted session request data and first signature index are then sent to the server.

Here, after the first signature index is encrypted and sent to the server, the server may acquire the first signature index and then index the first signature for signature verification.

In an implementation mode, after the encryption channel is established, a subsequent session may be implemented between the terminal and the server, specifically including that: a first operation is acquired, and first data corresponding to the first operation is determined; the second key and the second signature are located from the at least one key and the at least one signature according to the second key index and the second signature index; the first data is signed with the second signature, and the first data is encrypted with the second key and sent to the server; and second data signed with the second signature and encrypted with the second key is received from the server after decryption and signature verification by the server over the first data succeed, wherein the second data is an execution result of the first data.

The solution is applicable to a one-off operating flow, for example, the terminal requests for an order list. Since the flow has no interdependence relationship, the terminal performs the following processing: a user triggers a first operation (requesting for an order list) on the terminal; and the terminal acquires first data (information such as account data and an order list ID) corresponding to the first operation, signs the first data with a new signature (the second signature) and then encrypts the signed first data using a new key (the second key) and sends the encrypted data to the server. The server determines the login state at first, reads the key index and the signature index from the login-state session object, performs decryption using the key corresponding to the key index, performs signature verification using the signature corresponding to the signature index, executes a service logic to obtain the second data if signature verification succeeds, and then signs and encrypts the second data with the new key and signature and sends the signed and encrypted second data to the terminal.

In another implementation mode, after the encryption channel is established, a subsequent session may be implemented between the terminal and the server, specifically including that: a second operation is acquired, and third data corresponding to the second operation is determined; the second key and the second signature are located from the at least one key and the at least one signature according to the second key index and the second signature index; the third data is signed with the second signature, and the third data is encrypted with the second key and sent to the server; and fourth data signed with a third signature and encrypted with the second key is received from the server after decryption and signature verification by the server over the third data succeed, wherein the fourth data is an execution result of the third data, and the second key index and a third signature index are stored in the login session object.

The solution is applicable to multiple operating flows in a dependence relationship, for example, a flow in which NFC loading needs multiple interactions and each interaction flow has the dependence relationship with each other. In each request response process, the server specifies a completely new signature index, and stores the signature index into the login session object and sends the signature index to the terminal together with a response. In a subsequent request of the terminal, encryption is performed using the key (the second key) corresponding to the key index, and signing is performed using a signature (Next Key) corresponding to the continuously updated signature index in the whole communication process. During subsequent terminal request processing, the server may perform signature verification with a signature (Next Key) corresponding to a one-off signature index, besides continuing performing encryption with the key corresponding to the key index in the login session object, thereby greatly improving the security.

Figure 2:
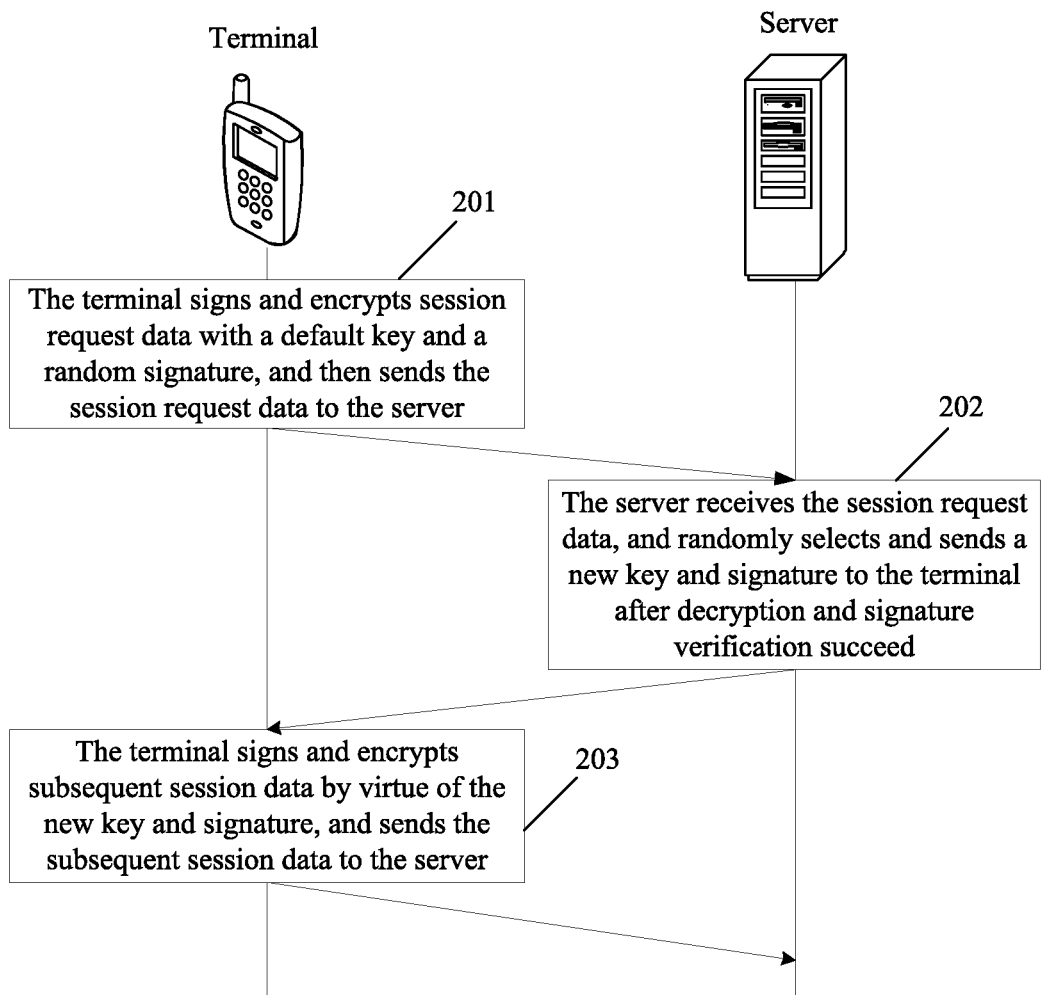
FIG. 2 is a flowchart of a method for dynamic encryption and signing according to embodiment 2 of the present disclosure.

The abovementioned method for dynamic encryption and signing will be further described below with reference to FIG. 2. Keys and signatures in this example are all obtained according to the key indexes and signature indexes in the abovementioned solution, which will not be elaborated herein. An encryption and signing process is directly described. Those skilled in the art may know that processes of obtaining a key using a key index and obtaining a signature obtained using a signature index are also included here. FIG. 2 is a flowchart of a method for dynamic encryption and signing according to embodiment 2 of the present disclosure. The method includes the following steps.

In Step 201, a terminal signs and encrypts session request data with a default key and a random signature, and sends the signed and encrypted session request data to a server.

In Step 202, the server receives the session request data, and randomly selects and sends a new key and signature to the terminal after decryption and signature verification succeed.

In Step 203, the terminal signs and encrypts subsequent session data with the new key and signature, and sends the signed and encrypted subsequent session data to the server.

Figure 3:
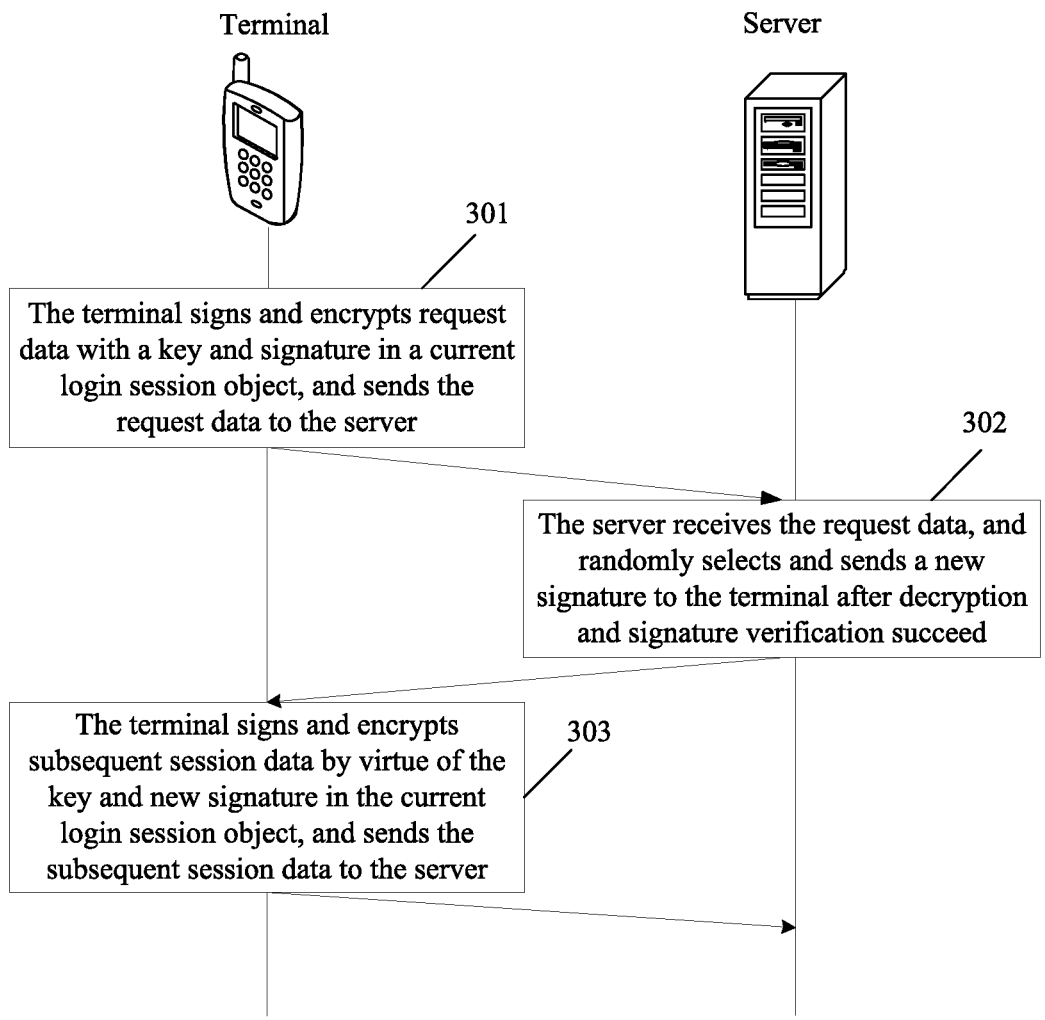
FIG. 3 is a flowchart of a method for dynamic encryption and signing according to embodiment 3 of the present disclosure.

The abovementioned method for dynamic encryption and signing will be further described below with reference to FIG. 3. Keys and signatures in this example are all obtained according to the key indexes and signature indexes in the abovementioned solution, which will not be elaborated herein. An encryption and signing process is directly described. Those skilled in the art may know that processes of obtaining a key using a key index and obtaining a signature obtained using a signature index are also included here. FIG. 3 is a flowchart of a method for dynamic encryption and signing according to embodiment 3 of the present disclosure. The method includes the following steps.

In Step 301, a terminal signs and encrypts request data with a key and signature in a current login session object, and sends the signed and encrypted request data to a server.

In Step 302, the server receives the request data, and randomly selects and sends a new signature to the terminal after decryption and signature verification succeed.

The new signature is stored in the login session object.

In Step 303, the terminal signs and encrypts subsequent session data with the key and new signature in the current login session object, and sends the subsequent session to the server.

For an operating flow involving a dependence relationship, the server may dynamically generate a one-off signature and send the signature to the terminal together with response data of the server every time. After completing processing a service logic, the terminal may sign data with the signature received last time and send the signed data to the server during next interaction, so that tamper-proofing of a request result of the terminal may be ensured.

Figure 4:
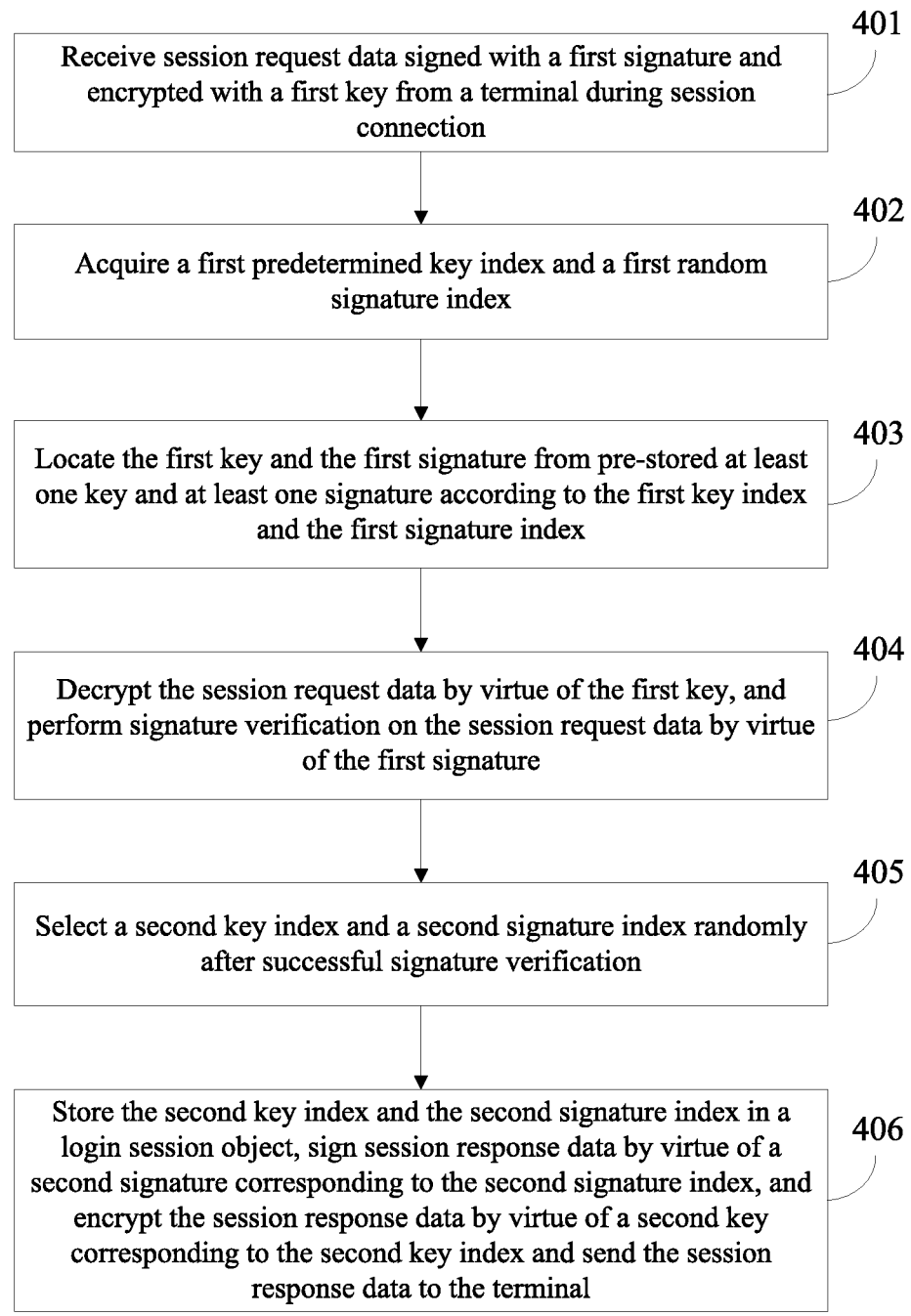
FIG. 4 is a flowchart of a method for dynamic encryption and signing according to embodiment 4 of the present disclosure.

FIG. 4 is a flowchart of a method for dynamic encryption and signing according to embodiment 4 of the present disclosure. The method for dynamic encryption and signing in this example is applied to a server side. As shown in FIG. 4, the method for dynamic encryption and signing includes the following steps.

In Step 401, session request data signed with a first signature and encrypted with a first key is received from a terminal during session connection.

In Step 402, a first predetermined key index and a first random signature index are acquired.

Here, the terminal and the server predetermine the first key index, so that the server may directly acquire the first key index.

In the embodiment of the present disclosure, the first signature index may be obtained by the following steps that: the session request data signed with the first signature and encrypted with the first key is received from the terminal, and the first signature index encrypted with the first key is simultaneously received from the terminal; and the encrypted first signature index is decrypted to obtain the first signature index using the first predetermined key index.

In Step 403, the first key and the first signature are located from pre-stored at least one key and at least one signature according to the first key index and the first signature index.

In Step 404, the session request data is decrypted using the first key, and signature verification is performed on the session request data using the first signature.

In Step 405, a second key index and a second signature index are randomly selected after the signature verification succeeds.

In Step 406, the second key index and the second signature index are stored in a login session object, session response data is signed with a second signature corresponding to the second signature index, and the session response data is encrypted with a second key corresponding to the second key index and sent to the terminal.

According to the steps above, an encryption channel of a login state lifecycle is established between the terminal and the server.

In an implementation mode, after the encryption channel is established, first data signed with the second signature and encrypted with the second key is received from the terminal; the second key and the second signature are located from the pre-stored at least one key and at least one signature according to the second key index and the second signature index; the first data is decrypted using the second key, and signature verification is performed on the first data using the second signature; the first data is processed to obtain second data after the signature verification succeeds; and the second data is signed with the second signature, and the second data is encrypted with the second key and sent to the terminal.

The solution is applicable to a one-off operating flow, for example, the terminal requests for an order list. Since the flow has no interdependence relationship, the terminal performs the following processing: a user triggers a first operation (requesting for an order list) on the terminal, and the terminal acquires first data (information such as account data and an order list ID) corresponding to the first operation, signs the first data with a new signature (the second signature), encrypts the first data with a new key (the second key) and then sends the encrypted first data to the server. The server determines a login state at first, reads the key index and the signature index from the login-state session object, performs decryption using the key corresponding to the key index, performs signature verification using the signature corresponding to the signature index, executes a service logic to obtain the second data if signature verification succeeds, and then signs and encrypts the second data with the new key and signature and sends the encrypted data to the terminal.

In another implementation mode, after the encryption channel is established, third data signed with the second signature and encrypted with the second key is received from the terminal; the second key and the second signature are located from the pre-stored at least one key and at least one signature according to the second key index and the second signature index; the third data is decrypted using the second key, and signature verification is performed on the third data using the second signature; the third data is processed to obtain fourth data after the signature verification succeeds; a third signature index is randomly selected, and the second signature index in the login session object is replaced with the third signature index; and the fourth data is signed with a third signature corresponding to the third signature index, and the fourth data is encrypted with the second key corresponding to the second key index and sent to the terminal.

The solution is applicable to multiple operating flows in a dependence relationship. For example, a flow in which NFC loading needs multiple interactions and each interaction flow have the dependence relationship with each other. In each request response process, the server specifies a completely new signature index, and stores the signature index in the login session object and then sends the signature index to the terminal together with a response.

In a subsequent request of the terminal, during the whole communication process, encryption is performed using the key (the second key) corresponding to the key index, and signing is performed using a signature (Next Key) corresponding to the continuously updated signature index. During subsequent terminal request processing, the server may perform signature verification using a signature (Next Key) corresponding to a one-off signature index, besides continuing performing encryption using the key corresponding to the key index in the login session object, thereby greatly improving security.

Figure 5:
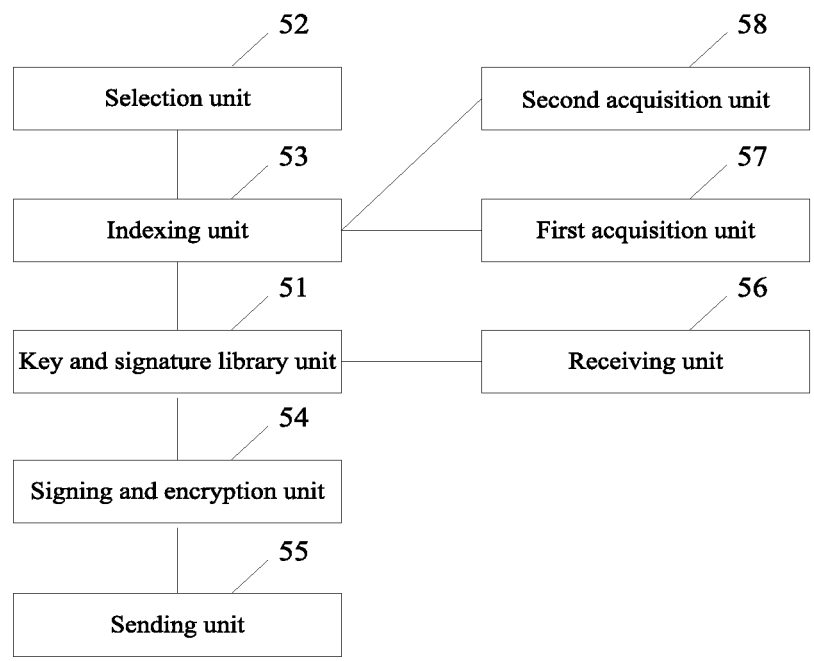
FIG. 5 is a structure diagram of a terminal according to an embodiment of the present disclosure.

FIG. 5 is a structure diagram of a terminal according to an embodiment of the present disclosure. As shown in FIG. 5, the terminal includes: a key and signature library unit 51, arranged to generate at least one key and at least one signature through native data; a selection unit 52, arranged to select a first predetermined key index and a first random signature index during session connection; an indexing unit 53, arranged to locate a first key and a first signature from the at least one key and the at least one signature according to the first key index and the first signature index; a Signing and encryption unit 54, arranged to sign session request data with the first signature, and encrypt the session request data with the first key; and a sending unit 55, arranged to send the encrypted session request data to a server; and a receiving unit 56, arranged to receive session response data signed with a second random signature and encrypted with a second random key from the server after decryption and signature verification by the server over the session request data succeed, wherein a second key index and a second signature index are stored in a login session object.

In the embodiment of the present disclosure, the selection unit 52 is further arranged to acquire a current timestamp, and perform first transformation on the current timestamp to obtain the first signature index; or, acquire a random number, and perform second transformation on the random number to obtain the first signature index.

In the embodiment of the present disclosure, the Signing and encryption unit 54 is further arranged to encrypt the first signature index at the same time of encrypting the session request data with the first key; and the sending unit 55 is further arranged to send the encrypted session request data and first signature index to the server.

In the embodiment of the present disclosure, the terminal further includes: a first acquisition unit 57, arranged to acquire a first operation, and determine first data corresponding to the first operation; the indexing unit 53 is further arranged to locate the second key and the second signature from the at least one key and the at least one signature according to the second key index and the second signature index; the Signing and encryption unit 54 is further arranged to sign the first data with the second signature, and encrypt the first data with the second key; the sending unit 55 is further arranged to send the encrypted first data to the server; and the receiving unit 56 is further arranged to receive second data signed with the second signature and encrypted with the second key from the server after decryption and signature verification by the server over the first data succeed, wherein the second data is an execution result of the first data.

In the embodiment of the present disclosure, the terminal further includes: a second acquisition unit 58, arranged to acquire a second operation, and determine third data corresponding to the second operation; the indexing unit 53 is further arranged to locate the second key and the second signature from the at least one key and the at least one signature according to the second key index and the second signature index; the Signing and encryption unit 54 is further arranged to sign the third data with the second signature, and encrypt the third data with the second key; the sending unit 55 is further arranged to send the encrypted third data to the server; and the receiving unit 56 is further arranged to receive fourth data signed with a third signature and encrypted with the second key from the server after decryption and signature verification by the server over the third data succeed, wherein the fourth data is an execution result of the third data, and the second key index and a third signature index are stored in the login session object.

Those skilled in the art may know that functions realized by each unit in the terminal shown in FIG. 5 may be understood with reference to related descriptions in the abovementioned method for dynamic encryption and signing. The functions of each unit in the terminal shown in FIG. 5 may be realized through a program running on a processor, or may also be realized through a specific logic circuit.

Figure 6:
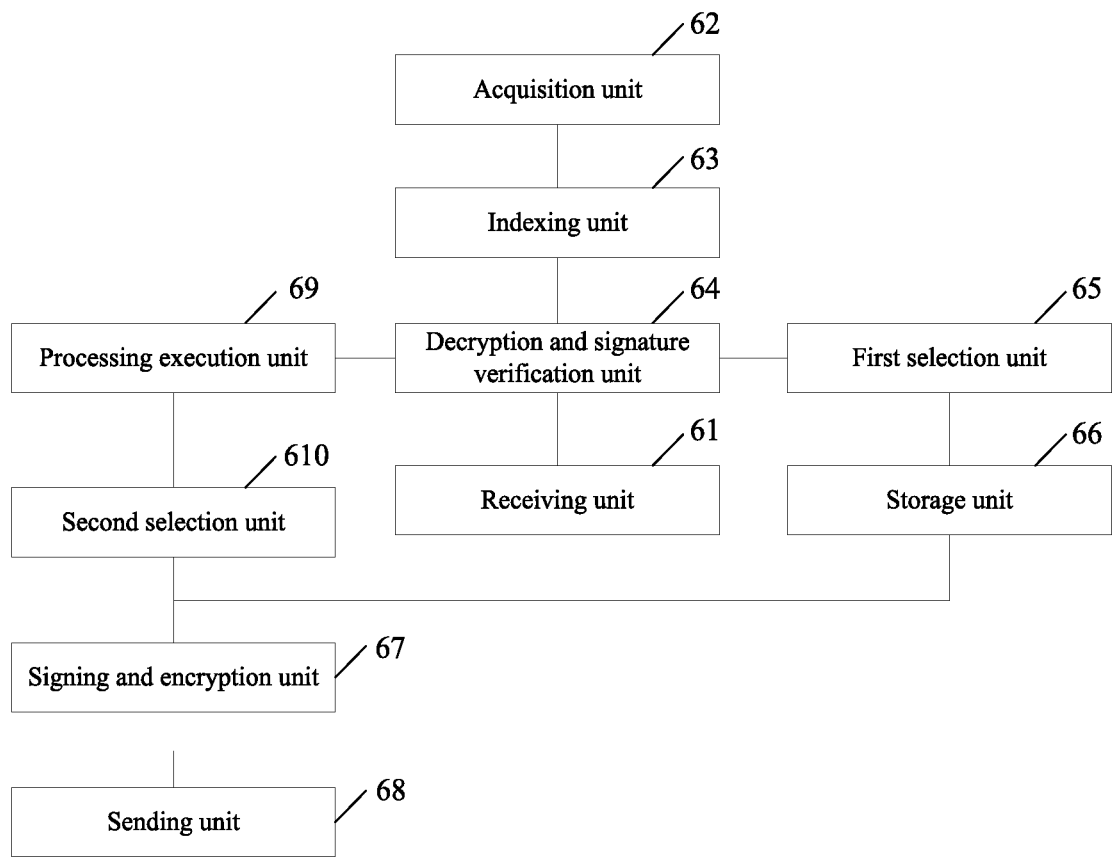
FIG. 6 is a structure diagram of a server according to an embodiment of the present disclosure.

FIG. 6 is a structure diagram of a server according to an embodiment of the present disclosure. As shown in FIG. 6, the server includes: a receiving unit 61, arranged to receive session request data signed with a first signature and encrypted with a first key from a terminal during session connection; an acquisition unit 62, arranged to acquire a first predetermined key index and a first random signature index; an indexing unit 63, arranged to locate the first key and the first signature from pre-stored at least one key and at least one signature according to the first key index and the first signature index; a decryption and signature verification unit 64, arranged to decrypt the session request data using the first key, and perform signature verification on the session request data using the first signature; a first selection unit 65, arranged to randomly select a second key index and a second signature index after the signature verification succeeds; a storage unit 66, arranged to store the second key index and the second signature index into a login session object; a Signing and encryption unit 67, arranged to sign session response data with a second signature corresponding to the second signature index, and encrypt the session response data with a second key corresponding to the second key index; and a sending unit 68, arranged to send the encrypted session response data to the terminal.

In the embodiment of the present disclosure, the receiving unit 61 is further arranged to receive the first signature index encrypted with the first key from the terminal at the same time of receiving the session request data signed with the first signature and encrypted with the first key from the terminal; and the decryption and signature verification unit 64 is further arranged to decrypt the encrypted first signature index to obtain the first signature index using the first predetermined key index.

In the embodiment of the present disclosure, the receiving unit 61 is further arranged to receive first data signed with the second signature and encrypted with the second key from the terminal; the indexing unit 63 is further arranged to locate the second key and the second signature from the pre-stored at least one key and at least one signature according to the second key index and the second signature index; the decryption and signature verification unit 64 is further arranged to decrypt the first data using the second key, and perform signature verification on the first data using the second signature; the server further includes: a processing execution unit 69, arranged to process the first data to obtain second data after the signature verification succeeds; the Signing and encryption unit 67 is further arranged to sign the second data with the second signature, and encrypt the second data with the second key; and the sending unit 68 is further arranged to send the encrypted second data to the terminal.

In the embodiment of the present disclosure, the receiving unit 61 is further arranged to receive third data signed with the second signature and encrypted with the second key from the terminal; the indexing unit 63 is further arranged to locate the second key and the second signature from the pre-stored at least one key and at least one signature according to the second key index and the second signature index; the decryption and signature verification unit 64 is further arranged to decrypt the third data using the second key, and perform signature verification on the third data using the second signature; the server further includes: a processing execution unit 69, arranged to process the third data to obtain fourth data after the signature verification succeeds, and a second selection unit 610, arranged to randomly select a third signature index; the storage unit 66 is further arranged to replace the second signature index in the login session object with the third signature index; the Signing and encryption unit 67 is further arranged to sign the fourth data with a third signature corresponding to the third signature index, and encrypt the fourth data with the second key corresponding to the second key index; and the sending unit 68 is further arranged to send the encrypted fourth data to the terminal.

Those skilled in the art may know that functions realized by each unit in the server shown in FIG. 6 may be understood with reference to related descriptions in the abovementioned method for dynamic encryption and signing. The functions of each unit in the server shown in FIG. 6 may be realized through a program running on a processor, or may also be realized through a specific logic circuit.

Figure 7:
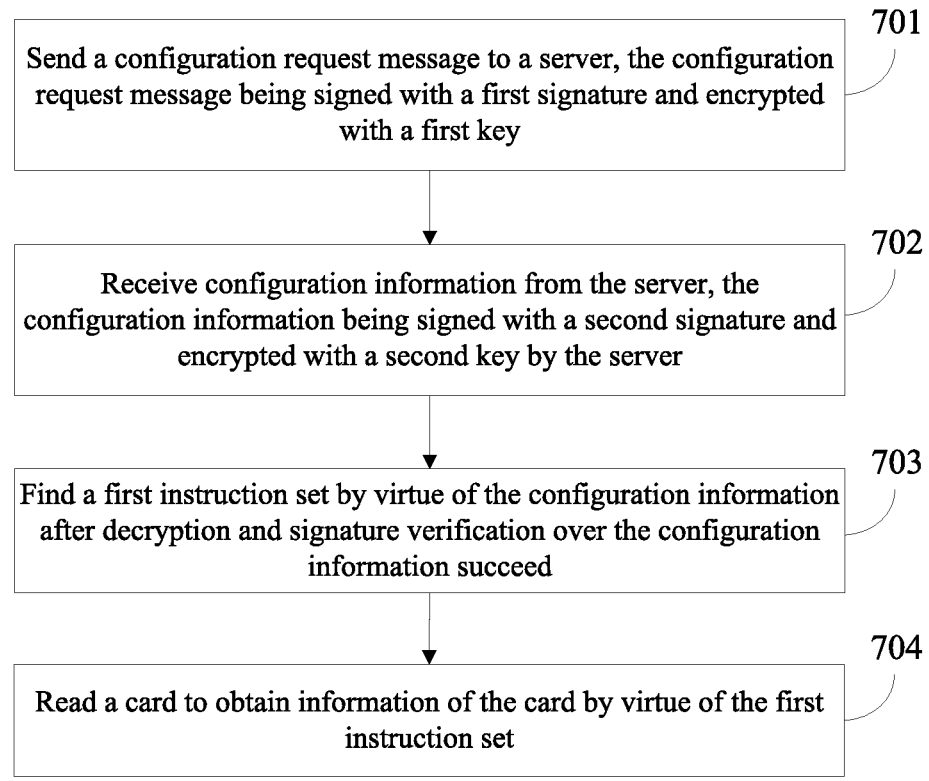
FIG. 7 is a flowchart of a method for dynamic encryption and signing according to another embodiment of the present disclosure.

FIG. 7 is a flowchart of a method for dynamic encryption and signing according to another embodiment of the present disclosure. The method is applied to a terminal, and as shown in FIG. 7, includes the following steps.

In Step 701, a configuration request message is sent to a server, the configuration request message being signed with a first signature and encrypted with a first key.

In the embodiment of the present disclosure, the terminal has an NFC function, and may be used as a bus card. Information in the bus card specifically includes a city to which the bus card belongs, balance information of the bus card and the like. The bus card in the embodiment of the present disclosure is applicable to multiple cities, so that multiple kinds of different configuration information are needed to support these functions of the bus card.

On such a basis, an application related to the bus card is installed on the terminal, and after a user starts the application, an initialization request is sent to the server, the initialization request including a configuration request message.

In Step 702, configuration information sent by the server is received, the configuration information being signed with a second signature and encrypted with a second key by the server.

Here, the server does not send the configuration information to the terminal every time because that may cause high traffic consumption. Therefore, when the terminal sends a configuration request message, a current version number of the terminal is also sent to the server, and the server compares whether the version number of the terminal is matched with a version number needed to be updated, and sends updated configuration information to the terminal only under the condition that they are not matched with each other.

In Step 703, a first instruction set is found using the configuration information after decryption and signature verification over the configuration information succeed.

Here, the first instruction set is the configuration information, and the first instruction set includes, but not limited to: an Application Protocol Data Unit (APDU) instruction set, a User Interface (UI) dynamic copywriting, a service flow switch and the like.

In Step 704, a card is read to obtain information of the card by virtue of the first instruction set.

Here, the information of the card may include the city to which the card belongs, corresponding balance information, and the like.

The keys and signatures in this example are all obtained according to the key indexes and signature indexes in the abovementioned solution, which will not be elaborated herein. An encryption and signing process is directly described. Those skilled in the art may know that processes of obtaining a key using a key index and obtaining a signature obtained using a signature index are also included here.

Figure 8:
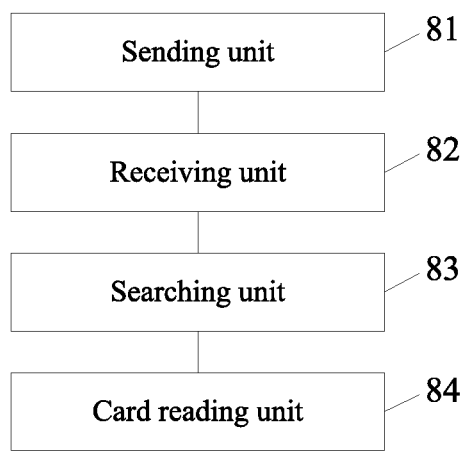
FIG. 8 is a structure diagram of a terminal according to another embodiment of the present disclosure.

FIG. 8 is a structure diagram of a terminal according to another embodiment of the present disclosure. As shown in FIG. 8, the terminal includes: a sending unit 81, arranged to send a configuration request message to a server, the configuration request message being signed with a first signature and encrypted with a first key; a receiving unit 82, arranged to receive configuration information from the server, the configuration information being signed with a second signature and encrypted with a second key by the server; a searching unit 83, arranged to find a first instruction set using the configuration information after decryption and signature verification over the configuration information succeed; and a card reading unit 84, arranged to read a card to obtain information of the card by virtue of the first instruction set.

The technical solutions described in the embodiments of the present disclosure may be freely combined under the condition of no conflicts.

Figure 9:
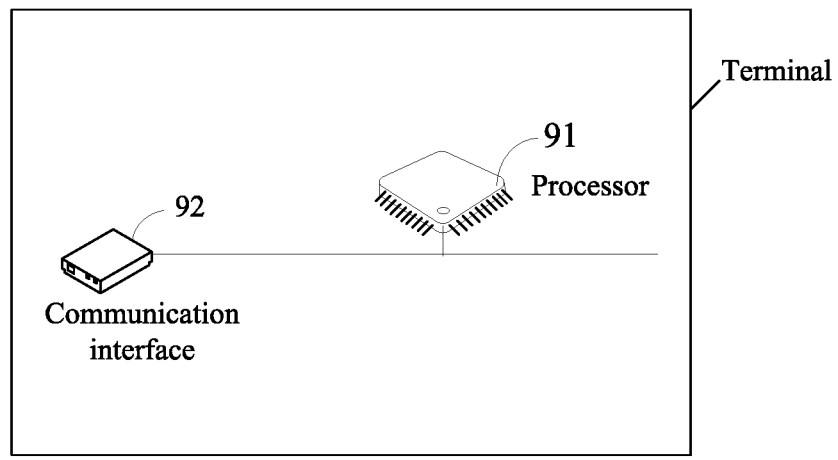
FIG. 9 is a schematic diagram of hardware of a terminal according to an embodiment of the present disclosure.

FIG. 9 is a schematic diagram of hardware of a terminal according to an embodiment of the present disclosure. As shown in FIG. 9, the terminal includes: a processor 91, arranged to execute the following operations through executable instructions: generating at least one key and at least one signature through native data, selecting a first predetermined key index and a first random signature index during session connection, locating a first key and a first signature from the at least one key and the at least one signature according to the first key index and the first signature index, signing session request data with the first signature, and encrypting the session request data with the first key; and a communication interface 92, arranged to send the encrypted session request data to a server, and receive session response data signed with a second random signature and encrypted with a second random key from the server after decryption and signature verification by the server over the session request data succeed.

The processor 91 is further arranged to execute the following operations through the executable instructions: acquiring a current timestamp, and performing first transformation on the current timestamp to obtain the first signature index; or, acquiring a random number, and performing second transformation on the random number to obtain the first signature index.

The processor 91 is further arranged to execute the following operation through the executable instructions: encrypting the first signature index at the same time of encrypting the session request data with the first key; and the communication interface 92 is further arranged to send the encrypted session request data and first signature index to the server.

The processor 91 is further arranged to execute the following operations through the executable instructions: acquiring a first operation, determining first data corresponding to the first operation, locating the second key and the second signature from the at least one key and the at least one signature according to a second key index and a second signature index, signing the first data with the second signature, and encrypting the first data with the second key; and the communication interface 92 is further arranged to send the encrypted first data to the server, and receive second data signed with the second signature and encrypted with the second key from the server after decryption and signature verification by the server over the first data succeed, wherein the second data is an execution result of the first data.

The processor 91 is further arranged to execute the following operations through the executable instructions: acquiring a second operation, determining third data corresponding to the second operation, locating the second key and the second signature from the at least one key and the at least one signature according to the second key index and the second signature index, signing the third data with the second signature, and encrypting the third data with the second key; and the communication interface 92 is further arranged to send the encrypted third data to the server, and receive fourth data signed with a third signature and encrypted with the second key from the server after decryption and signature verification by the server over the third data succeed, wherein the fourth data is an execution result of the third data.

The hardware of a terminal according to another embodiment of the present disclosure includes: a communication interface arranged to send a configuration request message to a server, the configuration request message being signed with a first signature and encrypted with a first key, and to receive configuration information from the server, the configuration information being signed with a second signature and encrypted with a second key by the server; and a processor, arranged to execute the following operations through executable instructions: locating a first instruction set using the configuration information after decryption and signature verification over the configuration information succeed, and reading a card to obtain information of the card by virtue of the first instruction set.

Figure 10:
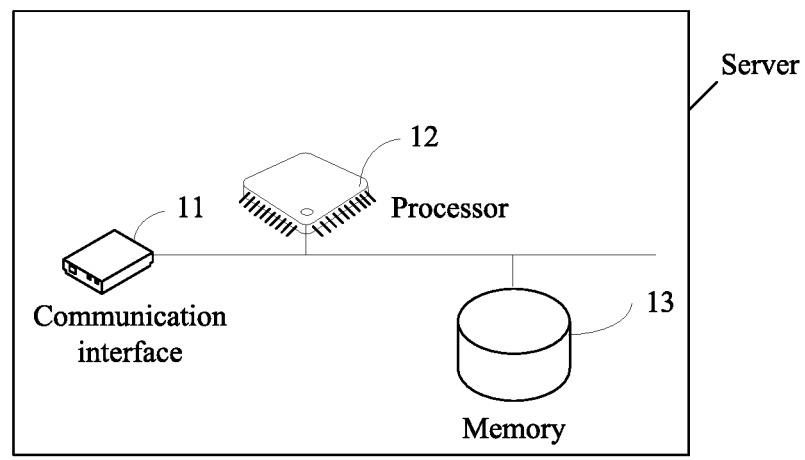
FIG. 10 is a schematic diagram of hardware of a server according to an embodiment of the present disclosure.

FIG. 10 is a schematic diagram of hardware of a server according to an embodiment of the present disclosure. As shown in FIG. 10, the server includes: a communication interface 11, arranged to receive session request data signed with a first signature and encrypted with a first key from a terminal during session connection; and a processor 12, arranged to execute the following operations through executable instructions: acquiring a first predetermined key index and a first random signature index, locating the first key and the first signature from pre-stored at least one key and at least one signature according to the first key index and the first signature index, decrypting the session request data by using the first key, performing signature verification on the session request data by using the first signature, randomly selecting a second key index and a second signature index after the signature verification succeeds, signing session response data with a second signature corresponding to the second signature index, and encrypting the session response data with a second key corresponding to the second key index, the communication interface 11 is further arranged to send the encrypted session response data to the terminal.

The communication interface 11 is further arranged to receive the first signature index encrypted with the first key from the terminal at the same time of receiving the session request data signed with the first signature and encrypted with the first key from the terminal; and the processor 12 is further arranged to execute the following operation through the executable instructions: decrypting the encrypted first signature index to obtain the first signature index using the first predetermined key index.

The communication interface 11 is further arranged to receive first data signed with the second signature and encrypted with the second key from the terminal; the processor 12 is further arranged to execute the following operations through the executable instructions: locating the second key and the second signature from the pre-stored at least one key and at least one signature according to the second key index and the second signature index, decrypting the first data by using the second key, performing signature verification on the first data by using the second signature, processing the first data to obtain second data after the signature verification succeeds, signing the second data with the second signature, and encrypting the second data with the second key; and the communication interface 11 is further arranged to send the encrypted second data to the terminal.

The communication interface 11 is further arranged to receive third data signed with the second signature and encrypted with the second key from the terminal; the processor 12 is further arranged to execute the following operations through the executable instructions: locating the second key and the second signature from the pre-stored at least one key and at least one signature according to the second key index and the second signature index, decrypting the third data by using the second key, performing signature verification on the third data by using the second signature, processing the third data to obtain fourth data after the signature verification succeeds, and randomly selecting a third signature index; the server includes: a memory 13, arranged to replace the second signature index with the third signature index; the processor 12 is further arranged to execute the following operations through the executable instructions: signing the fourth data with a third signature corresponding to the third signature index, and encrypting the fourth data with the second key corresponding to the second key index; and the communication interface 11 is further arranged to send the encrypted fourth data to the terminal.

When being implemented in form of software functional modules and sold or used as an independent product, the integrated module in the embodiments of the present disclosure may also be stored in a computer-readable storage medium. Based on such an understanding, those skilled in the art may know that the embodiments of the present disclosure may be provided as a method, a system or a computer program product. Therefore, the present disclosure may adopt a form of pure hardware embodiment, pure software embodiment or combined software and hardware embodiment. Moreover, the present disclosure may adopt a computer program product implemented on one or more computer-available storage media including computer-available program codes, and the storage medium includes, but not limited to, a U disk, a mobile hard disk, a Read-Only Memory (ROM), a Random Access Memory (RAM), a disk memory, a Compact Disc Read-Only Memory (CD-ROM), an optical memory and the like.

The present disclosure is described with reference to flowcharts and/or block diagrams of the method, equipment (system) and computer program product according to the embodiment of the present disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable data processing equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

Although the embodiments of the present disclosure have been described, those skilled in the art may make additional variations and modifications to these embodiments once learning about the basic creative concept. Therefore, the appended claims are intended to be explained to include the embodiments and all variations and modifications falling within the scope of the present disclosure.

Correspondingly, an embodiment of the present disclosure further provides a computer storage medium, in which a computer program is stored, the computer program being arranged to execute the abovementioned method for dynamic encryption and signing in the embodiment of the present disclosure.

In some embodiments provided by the present disclosure, it is to be understood that the described method and smart equipment may be implemented in another manner. The equipment embodiment described above is only schematic, and for example, division of the units is logic function division. Other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or in other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the present disclosure may be integrated into a second processing unit, each unit may also exist independently, and two or more than two units may also be integrated into a unit. The abovementioned integrated unit may be implemented in a hardware form, or may also be implemented in form of hardware and software function unit.

The above are only the specific implementation modes of the present disclosure and not intended to limit the scope of protection of the present disclosure. Any variations or replacements apparent to those skilled in the art within the technical scope disclosed by the present disclosure shall fall within the scope of protection of the present disclosure.

What is claimed is:

1. A method for dynamic encryption and signing, comprising:
    obtaining, by a terminal during session connection, a predetermined first key index and a randomly-generated first signature index, wherein the terminal and a server store same plurality of keys accessible by key indexes and same plurality of signatures accessible by signature indexes;
    signing session request data with a first signature corresponding to the first signature index;
    encrypting the session request data with a first key corresponding to the first key index;
    sending the encrypted session request data and the first signature index to the server; and
    receiving, from the server, session response data signed with a second signature corresponding to a second signature index and encrypted with a second key corresponding to a second key index, after decryption and signature verification according to the first key by the server over the session request data succeed, the second signature index and the second key index being randomly selected by the server and saved in a login session object accessible by both the server and the terminal.

2. The method according to claim 1, wherein obtaining randomly-generated first signature index comprises:
    acquiring a current timestamp, and performing first transformation on the current timestamp to obtain the first signature index; or,
    acquiring a random number, and performing second transformation on the random number to obtain the first signature index.

3. The method according to claim 1, further comprising: encrypting the first signature index with the first key at the same time of encrypting the session request data;
    wherein the first signature index sent to the server together with the encrypted session request data is encrypted.

4. The method according to claim 1, further comprising: after receiving the session response data,
    acquiring a first operation, and determining first data corresponding to the first operation;
    locating, by the terminal, the second key and the second signature according to the second key index and the second signature index stored in the login session object;
    signing the first data with the second signature, and encrypting the first data with the second key and sending the encrypted first data to the server; and
    receiving, from the server, second data signed with the second signature and encrypted with the second key after decryption and signature verification by the server over the first data succeed, wherein the second data is an execution result of the first data.

5. The method according to claim 1, further comprising: after receiving the session response data,
    acquiring a second operation, and determining third data corresponding to the second operation;
    locating, by the terminal, the second key and the second signature according to the second key index and the second signature index stored in the login session object;
    signing the third data with the second signature, and encrypting the third data with the second key and sending the encrypted third data to the server; and
    receiving, from the server, fourth data signed with a third signature and encrypted with the second key after decryption and signature verification by the server over the third data succeed, wherein the fourth data is an execution result of the third data.

6. The method according to claim 1, wherein an updated signature index is determined and stored in the login session object by the server when responding to each subsequent request from the terminal after sending the session response data, and the method further comprises:
    after receiving a response to a previous subsequent request, signing, by the terminal, a current subsequent session request data with an updated signature corresponding to the updated signature index;
    encrypting the current subsequent session request data with the second key; and
    sending the current encrypted subsequent session request data to the server.

7. A method for dynamic encryption and signing at a server, comprising:
    receiving, from a terminal, session request data signed with a first signature and encrypted with a first key, and a first signature index during session connection, the first signature index being randomly generated by the terminal, wherein the terminal and the server store same plurality of keys accessible by key indexes and same plurality of signatures accessible by signature indexes;
    locating the first key from the stored plurality of keys according to a first key index predetermined between the terminal and the server;
    locating the first signature from the plurality of signatures according to the first signature index;
    decrypting the session request data by using the first key, and performing signature verification on the session request data by using the first signature;

randomly selecting a second key index and a second signature index after the signature verification succeeds;

saving the second signature index and the second key index in a login session object accessible by both the server and the terminal; and signing session response data with a second signature corresponding to the second signature index, and encrypting the session response data with a second key corresponding to the second key index and sending the encrypted session response data to the terminal.

8. The method according to claim 7, further comprising:

establishing the login session object arranged to store information corresponding to the session between the server and the terminal when the signature verification on the session request data succeeds; and releasing the login session object after an idle time that no session request being made by the terminal exceeds a time limit.

9. The method according to claim 7, wherein the first signature index received from the terminal is encrypted, and the method further comprises:

decrypting, using the first key corresponding to the predetermined first key index, the encrypted first signature index to obtain the first signature index.

10. The method according to claim 7, further comprising:

receiving, from the terminal, first data signed with the second signature and encrypted with the second key;

decrypting the first data by using the second key, and performing signature verification on the first data by using the second signature;

processing the first data to obtain second data after the signature verification succeeds; and signing the second data with the second signature, and encrypting the second data with the second key and sending the encrypted second data to the terminal.

11. The method according to claim 7, further comprising:

receiving, from the terminal, third data signed with the second signature and encrypted with the second key;

decrypting the third data by using the second key, and performing signature verification on the third data by using the second signature;

processing the third data to obtain fourth data after the signature verification succeeds;

randomly selecting a third signature index, and replacing the second signature index with the third signature index in the login session object; and signing the fourth data with a third signature corresponding to the third signature index, and encrypting the fourth data with the second key corresponding to the second key index and sending the encrypted fourth data to the terminal.

12. The method according to claim 7, further comprising:

after sending the second session response data signed with the second signature and encrypted with the second key to the terminal, when responding to each subsequent request from the terminal, specifying an updated signature index, and storing the updated signature index in the login session object; and receiving, from the terminal, a following subsequent request signed with an updated signature corresponding to the updated signature index and encrypted with the second key.

13. A terminal comprising:

a memory; and a processor coupled to the memory and configured to:

obtain, during session connection, a predetermined first key index and a randomly-generated first signature index, wherein the terminal and a server store same plurality of keys accessible by key indexes and same plurality of signatures accessible by signature indexes;

sign session request data with a first signature corresponding to the first signature index; and encrypt the session request data with a first key corresponding to the first key index; and a communication interface configured to:

send the encrypted session request data and the first signature index to the server; and receive, from the server, session response data signed with a second signature corresponding to a second signature index and encrypted with a second key corresponding to a second key index, after decryption and signature verification according to the first key by the server over the session request data succeed, the second signature index and the second key index being randomly selected by the server and saved in a login session object accessible by both the server and the terminal.

14. The terminal according to claim 13, wherein the processor is further configured to:

acquire a current timestamp, and performing first transformation on the current timestamp to obtain the first signature index; or, acquire a random number, and performing second transformation on the random number to obtain the first signature index.

15. The terminal according to claim 13, wherein the processor is further configured to:

encrypt the first signature index with the first key at the same time of encrypting the session request data;

wherein the first signature index sent to the server together with the encrypted session request data is encrypted.

16. The terminal according to claim 13, wherein the processor is further configured to:

after receiving the session response data, acquire a first operation, and determine first data corresponding to the first operation;

locate the second key and the second signature according to the second key index and the second signature index stored in the login session object;

sign the first data with the second signature, and encrypt the first data with the second key and sending the encrypted first data to the server; and receive, from the server, second data signed with the second signature and encrypted with the second key after decryption and signature verification by the server over the first data succeed, wherein the second data is an execution result of the first data.

17. The terminal according to claim 13, wherein the processor is further configured to:

after receiving the session response data, acquire a second operation, and determine third data corresponding to the second operation;

locate the second key and the second signature according to the second key index and the second signature index stored in the login session object;

sign the third data with the second signature, and encrypt the third data with the second key and sending the encrypted third data to the server; and receive, from the server, fourth data signed with a third signature and encrypted with the second key after decryption and signature verification by the server over the third data succeed, wherein the fourth data is an execution result of the third data.

18. A server, comprising: a memory; and a processor coupled to the memory and configured to:

receive, from a terminal, session request data signed with a first signature and encrypted with a first key, and a first signature index during session connection, the first signature index being randomly generated by the terminal, wherein the terminal and the server store same plurality of keys accessible by key indexes and same plurality of signatures accessible by signature indexes;

locate the first key from the stored plurality of keys according to a first key index predetermined between the terminal and the server;

locate the first signature from the plurality of signatures according to the first signature index;

decrypt the session request data by using the first key, and perform signature verification on the session request data by using the first signature;

randomly select a second key index and a second signature index after the signature verification succeeds;

save the second signature index and the second key index in a login session object accessible by both the server and the terminal; and sign session response data with a second signature corresponding to the second signature index, encrypt the session response data with a second key corresponding to the second key index, and send the encrypted session response data to the terminal.

19. The server according to claim 18, wherein the first signature index received from the terminal is encrypted, and the processor is further configured to:

decrypt, using the first key corresponding to the predetermined first key index, the encrypted first signature index to obtain the first signature index.

20. The server according to claim 18, wherein the processor is further configured to:

after sending the second session response data signed with the second signature and encrypted with the second key to the terminal, when responding to each subsequent request from the terminal, specify an updated signature index, and store the updated signature index in the login session object; and receive, from the terminal, a following subsequent request signed with an updated signature corresponding to the updated signature index and encrypted with the second key.

* * * * *